(12) United States Patent
Finlayson et al.

(10) Patent No.: US 8,385,648 B2
(45) Date of Patent: Feb. 26, 2013

(54) DETECTING ILLUMINATION IN IMAGES

(75) Inventors: Graham D. Finlayson, Taverham (GB); Mark Samuel Drew, West Vancouver (CA); Clement Fredembach, Servion (CH)

(73) Assignee: Apple, Inc., Cupertino, CA (US)

( * ) Notice: Subject to any disclaimer, the term of this patent is extended or adjusted under 35 U.S.C. 154(b) by 692 days.

(21) Appl. No.: 12/514,079

(22) PCT Filed: Nov. 8, 2007

(86) PCT No.: PCT/GB2007/004247
§ 371 (c)(1),
(2), (4) Date: Dec. 17, 2009

(87) PCT Pub. No.: WO2008/056140
PCT Pub. Date: May 15, 2008

(65) Prior Publication Data
US 2010/0098330 A1 Apr. 22, 2010

(30) Foreign Application Priority Data

Nov. 8, 2006 (GB) .................................... 0622251.7
Jun. 5, 2007 (GB) .................................... 0710786.5

(51) Int. Cl.
*G06K 9/34* (2006.01)
*G06K 9/46* (2006.01)
(52) U.S. Cl. ........................................ 382/173; 382/191
(58) Field of Classification Search .................. 382/173, 382/191
See application file for complete search history.

(56) References Cited

U.S. PATENT DOCUMENTS

| 7,046,288 | B1 | 5/2006 | Finlayson |
| 7,084,907 | B2 * | 8/2006 | Takeshita .................... 348/223.1 |
| 7,835,002 | B2 * | 11/2010 | Muhammed et al. .......... 356/419 |
| 2003/0016863 | A1 | 1/2003 | Risson |

FOREIGN PATENT DOCUMENTS

WO  WO 00/01164 A2  1/2000

OTHER PUBLICATIONS

Yang Wang and Dimitris Samaras, "Estimation of Multiple Illuminants from a Single Image of Arbitrary Known Geometry" ECCV 2002, pp. 272-288.*
Comaniciu, Dorin, (2002) "Mean Shift: A Robust Approach Toward Feature Space Analysis," *IEEE Transactions on Pattern Analysis and Machine Intelligence*, vol. 24, No. 5, pp. 603-619.
McCamy et al., (1976) "A Color-Rendition Chart," *Journal of Applied Photographic Engineering*, vol. 2, No. 3, pp. 95-99.
Strang, G. "*Linear Algebra and its Applications*", Harcourt, Brace and Jovanovich, 4th Edition, pp. 146-148, 2005.
Finlayson G et al: "Detecting Illumination in Images;" Computer Vision 2007. IEEE 11th International Conference on Oct. 14, 2007.

(Continued)

*Primary Examiner* — Bhavesh Mehta
*Assistant Examiner* — Utpal Shah
(74) *Attorney, Agent, or Firm* — Wong, Cabello, Lutsch, Rutherford & Brucculeri, LLP

(57) ABSTRACT

An image having m light sources, with m preferably equaling 2 or 3, is sequenced into different regions, each of which is lit by only one of the m light sources, by obtaining paired imaged with different filtering, for example a filtered and an unfiltered image, applying to the image pairs sets of m pre-computed mappings at the pixel or region level, and selecting the most appropriate. The rendering of the information in the image maybe adjusted accordingly.

23 Claims, 2 Drawing Sheets

OTHER PUBLICATIONS

Salvador E et al: "Cast shadow segmentation using invariant color features;" Computer Vision and Image Understanding, Academic Press, San Diego, CA, vol. 95, No. 2, Aug. 2004.

Finlayson G et al: "Colour constancy using the chromagenic constraint;" Proceedings of the 2005 IEEE Computer Society Conference on Computer Vision and Pattern Recognition on Jun. 20, 2005.

Finlayson G et al: "4-Sensor Camera Calibration for Image Representation Invariant to Shading, Shadows, Lighting, and Specularities;" Proceedings of the Eight IEEE International Conference on Computer Vision, Jul. 7, 2001.

Cheng Lu et al: "Shadow Removal via Flash/Noflash Illumination;" 2006 IEEE 8th Workshop on IEEE.

Barnard et al., (2002) A Data Set for Color Research, *Color Research and Application*, vol. 27, No. 3, pp. 147-151.

D'Zmura et al., (1993) Color constancy. I. Basic theory of two-stage linear recovery of spectral descriptions for lights and surfaces, *J. Opt. Soc. Am. A*, vol. 10, No. 10, pp. 2148-2165.

Finlayson et al., (1993) Diagonal Transforms Suffice for Color Constancy, *Int. Conf. on Computer Vision (ICCV93)*.

Finlayson et al., (2005) Human Visual Processing: Beyond 3 Sensors, *IEE Int. Conf. on Visual Information Engg. (VIE2005)*, pp. 1-7.

Finlayson et al., (2002) Removing Shadows from Images, *ECCV 2002: European Conference on Computer Vision*, pp. 4:823-836, Lecture Notes in Computer Science vol. 2353.

Finlayson et al., (2005) Chromagenic Filter Design, *AIC Colour 05—10th Congress of the International Colour Association*, pp. 1023-1026.

Fredembach et al., (2005) Hamiltonian path based shadow removal, *British Machine Vision Conf.*

"*Linear Algebra and its Applications*", Harcourst Brace, Jovanovich, 4th Edition, pp. 146-148, 2005.

Maloney et al., (1986) Color constancy: a method for recovering surface spectral reflectance, *J. Opt. Soc. Am. A.*, 3:29-33.

Marimont et al., (1992) Linear models of surface and illuminant spectra, *J. Opt. Soc Am. A.*, 1905-1913.

Parkkinen et al., (1989) Characteristic spectra of Munsell colors, *J. Opt. Soc. Am. A*, 6:318-322.

Rubin et al., (1982) Color Vision and Image Intensities: When are Changes Material?, *Biol. Cybern.*, 45:215-226.

Tappen et al., (2003) Recovering Intrinsic Images from a Single Image, *Advances in Neural Information Processing Systems 15*, MIT Press.

Tsukada et al., (1990) An Approach to Color Constancy Using Multiple Images, *Int. Conf. on Computer Vision (ICCV90)*, pp. 385-389.

\* cited by examiner

DETECTING ILLUMINATION IN IMAGES

BACKGROUND OF THE INVENTION

Much of computer vision, image processing and imaging in general is predicated on the assumption that there is a single prevailing illuminant lighting a scene. However, often there are multiple lights. Common examples include outdoor scenes with cast and attached shadows, indoor office environments which are typically lit by skylight and artificial illumination and the spot-lighting used in commercial premises and galleries. Relative to these mixed lighting conditions, many imaging algorithms (based on the single light assumption) can fail. Examples of failure include the inability to track objects as they cross a shadow boundary or tracking a shadow rather than the object, an incorrect colour balance being chosen in image reproduction (e.g., when printing photographs) and in an incorrect rendering of the information captured in a scene. The last problem is particularly acute when images containing strong shadows are reproduced. Operating under the single light assumption, the imaging practitioner can chose either to make the image brighter (seeing into the shadows) at the cost of compressing the detail in the lighter image areas or conversely keeping the bright areas intact but not bring out the shadow detail. Indeed, many photographs are a poor facsimile of the scenes we remember because our own visual system treats shadow and highlight regions in a spatially adaptive way in order to arrive at quite a different perceptual image.

There is a good deal of work in the literature for identifying illumination change in images. Most of the previous approaches work by comparing pixels (or regions) that are spatially adjacent. Rubins and Richards [1] argue that the RGBs across a shadow edge have a certain well defined relationship. When this relationship does not hold then the edge is not a shadow edge. Freeman et al. [2] learn the statistics of reflectance and illumination edges and have some success at classifying edges in images. Finlayson et al. in [3] show how a single grey scale image can be formed from a colour image where there are no edges due to illumination. Comparing edges in this image with those in the colour image is used as a means for shadow edge detection. Moreover, in [4] Fredembach and Finlayson consider how local edges can be integrated to identify coherent shadow regions. Re-integration of edges, with edges on shadow boundaries bridged across the boundary, results in a colour without shadows, to a good degree. In these methods, shadow edges are key. While this method can work well, it is far from perfect, and moreover is tailored to the shadow detection, as opposed to the illumination detection problem. Further, a region-based rather than edge-based method would provide more evidence indicating shadows.

SUMMARY OF THE INVENTION

Aspects of the present invention seek to provide a method for segmenting illumination in images.

According to a first aspect of the present invention, there is provided a method for processing an image having a plurality m of light sources by segmenting the image into different regions, each of which is lit by only one of the m light sources, the method comprising the steps of obtaining paired images with different sets of spectral components and applying sets of m pre-computed mappings at the pixel or region level to the image pairs.

The images may be paired images with different filtering, e.g. filtered and unfiltered images.

The present invention is based on the realisation that the relationship between image colours (e.g. RGBs) and corresponding image colours captured through a coloured filter depends on illumination. Methods according to the present invention determine the number of distinct relations present in an image and filtered image pair and by assigning a relation to each pixel or region identify which parts of the image correspond to different colours of light. The method works:

for an RGB camera and R, G or B filtered counterparts;
for an RGB camera and a second set of one or more sensor responses (e.g. C, M and/or Y);
for any camera that takes a primary multispectral image (with two or more sensors) and a secondary multispectral image (with one or more sensors);
given a camera with N spectral sensitivities capturing a primary image and examining the relationship between the image and a second image which has M sensor measurements.
For example, if we take an n sensor camera, the first m measurements can be related to the remaining n–m sensors, and so the relation could be an (n–m)×m matrix. For n=6 and m=3 we have a 3×3 matrix relation.

Relationships can be computed based on the image data or can be precomputed in a training stage. Relations can be assigned to pixels or regions (and so regions or pixels identified as particular illuminants) using a robust statistical optimisation procedure or using a simple search procedure. The search procedure involves two stages. First, a set of m relations is chosen from the larger set of N all possible relations. Second, the appropriateness of a chosen m set is computed for the primary and secondary image pair. The m-set that is the most appropriate overall determines which pixels or regions are lit by which lights.

The appropriateness of a given relation is determined by how well it predicts a particular secondary image response vector given a corresponding primary response vector. If relations are linear transforms, the responses from the primary images are mapped by one of the m relations in the m-set and the one which generated a new set of outputs which are closest to the secondary image outputs is deemed most appropriate. In general a relation is the most appropriate if it is more likely (when tested against the other m−1) candidates in some mathematical sense.

Assuming that the primary and secondary images combined have p measurements per pixel, we can calculate likelihood by means of many methods. These methods test the relationship between the first q−p responses to the last p responses (using linear or non linear functions and any arbitrary distance measure). Equally, the position of the q vector can be used directly and this includes calculating the proximity to a given plane or by a computing a probablistic or other measure. The information that is needed to measure whether a q vector is consistent with a given light can be precalculated or can be calculated based on the statistics of the image itself.

The appropriateness of relations can be calculated for pixels or regions.

Statistical analysis can be used to evaluate which is the best relation to apply to a set of pixels. The relation that best models a set of pixels could be the relationship which was found to be appropriate the most often.

Alternatively, the appropriateness of a set of relations is calculated across an image. The difference between the actual secondary response and that predicted by the relation is summed up across the image. This gives a score for the goodness of a particular relation m-set. The m-set of relations that best accounts for the image data is found by search.

Images of scenes with cast shadows have two illuminants (direct light and sky and sky only (i.e. for the shadowed regions). According to the present invention the shadow and non shadow areas are found by testing the appropriateness of all pairs of relations in turn.

Indoor scenes with overhead illumination and light from the window, which may be direct and shadowed, allow for three possible lights. According to the present invention, regions are classified to one of three lights by testing the appropriateness of all triples of relations in turn.

According to a second aspect of the present invention, there is provided a method for processing an image having a plurality m of light sources by segmenting the image into different regions, each of which is lit by only one of the m light sources, the method comprising the steps of obtaining paired images with different sets of spectral components finding a best mapping between the images and assigning the majority of pixels best transformed under the mapping found to a first label and others to a second label.

According to a third, aspect of the present invention, there is provided a method for processing an image having a plurality m of light sources by segmenting the image into different regions, each of which is lit by only one of the m light sources, the method comprising the steps of obtaining paired images with different sets of spectral components undertaking a chromagenic preprocessing step for a plurality N illuminants (where N>m) to produce N relations $\Re$ determining for each pixel or region which of the m relations of an m-element subset R best maps the two images.

The images may have different filtering, for example filtered and unfiltered images.

According to a fourth aspect of the present invention, there is provided a method of improving the accuracy of information in an image employing the steps of a method according to the first, second and third aspects, and accordingly adjusting the rendering of the information in the image.

According to a fifth aspect of the present invention, there is provided an image treatment system comprises means for detecting illumination in an image and means for implementing the steps according to the first, second, third or fourth aspects to adjust the treatment of the images.

The present invention relates to a method for identifying illumination in images. In particular, given an input region with m different lights present, a method is disclosed for segmenting an image into different regions where each region is lit by only one of the m lights. The method starts with the chromagenic camera discussed in [5, 6, 7]. A chromagenic camera takes two pictures of a scene: the first is a conventional RGB image but the second is taken with the same camera using a coloured filter placed in front of the camera optical system. The chromagenic idea also extends to other camera architectures (see [5, 8] for a discussion); e.g., a camera that has more than 3 sensors can be considered chromagenic in terms of the general theory. In previous work two results were shown. First, that the relationship between RGBs and filtered RGBs depends on the illumination: different lights lead to different relationships. Second, that using (pre-computed) relations alone it was possible to estimate the light colour present in the scene. Moreover, the chromagenic approach was shown to provide a more accurate estimate of the illuminant colour than other methods [7]. While the chromagenic approach worked well on average for the single-prevailing-light illuminant estimation problem, it is in itself not directly applicable for multiple light detection. Indeed, the performance of the chromagenic algorithm for illuminant estimation diminished if only a small proportion of the input pixels were used. Therefore, if many of the input pixels are illuminated by other lights, chromagenic illumination estimation will decrease in accuracy.

In this work we assume only that we have pre-computed for a particular camera a set R of N relations that might plausibly map RGBs to filtered counterparts, for N different lights. If there are in fact m lights in an image newly presented then in this invention we can find the set of m relations which best predicts our data. Here, each pixel, or region, is associated with the relation (one of the m) that best maps the pixel, or region, to the filtered counterparts. These m relations are found by using the N pre-computed relations established for this camera. Once found, the pixels, or regions, associated with the same relation are assumed to be illuminated under the same light. Of course, if we find that only a subset of the m relations are used, we conclude that there are fewer lights than originally hypothesised. This is an important point as, pragmatically, an algorithm performing reasonably can only assume that there will be m lights in any given scene if, when there are indeed fewer than m lights, the algorithm reports that this is so. For example, in many circumstances it will suffice to assume that there are two or fewer lights. We seek a method which detects two lights when two lights are present but that detects a single illumination when the scene is lit by a single light.

BRIEF DESCRIPTION OF THE DRAWINGS

Preferred embodiments of the present invention will now be described, by way of example only, with reference to the accompanying drawings, of which:

FIG. 3b shows the result of a region-based illuminant detection procedure using the information represented in FIG. 2b and FIG. 3a.

DETAILED DESCRIPTION OF PREFERRED VERSIONS OF THE INVENTION

Figure 1:
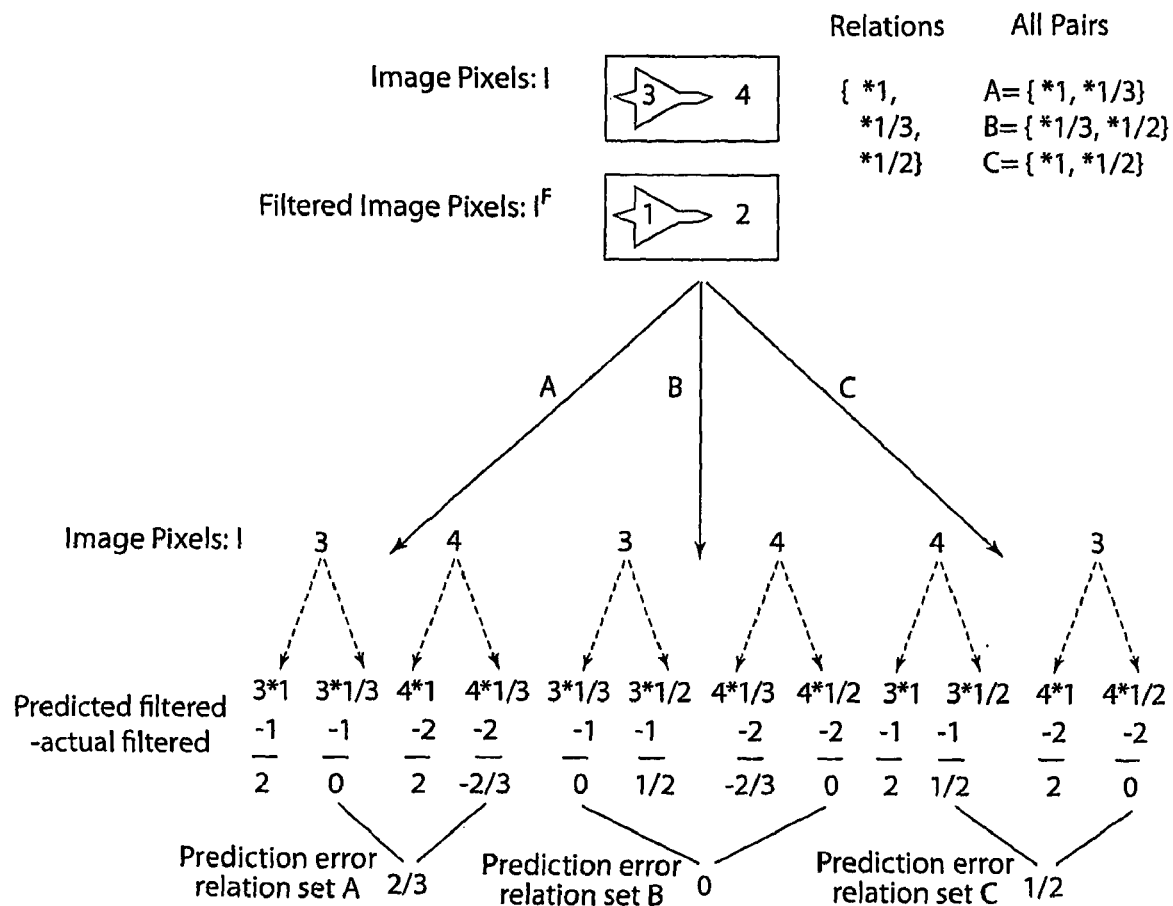
FIG. 1 illustrates a method in accordance with a preferred embodiment of the present invention.

We illustrate a method in accordance with the invention schematically in FIG. 1. Pre-calculated mappings (here represented by scalar multiplication factors 1, ⅓, and ½) are applied to unfiltered pixel values {3, 4} to best match filtered counterparts {1, 2}. Here we have a very simple image with two regions which for the purposes of this example are represented by single numbers (perhaps this image is the cast shadow of an aeroplane flying over the ground). The top image I, has the region labelled '3' representing a shadow. In this diagrammatic representation, we do not illustrate the algorithm using colour, which the method actually uses in practice. Instead, we simplify to a single, scalar value at each pixel for illustrative purposes. In FIG. 1, the labels '1', '2', '3', '4', are the labels for each region and are also the pixel values: e.g., in the shadow region of image I, the scalar value of the image pixels is the number 3. A corresponding filtered image again with 2 regions is shown having regions '1' and '2' and is denoted as $I^F$.

For these scalar-values images, our pre-computed set $\Re$ of mappings from unfiltered to filtered pixel values are simply a set of N scalars, one for each of N lights. Now suppose in this example we have predetermined a set of N=3 mappings for 3 lights, and the mappings from unfiltered to filtered camera responses are given by the three scalars {1, ⅓, ½}. On the right-hand side there these three possible mappings are shown: the first mapping is designated by '*1', where *1 means we can multiply the image pixel by 1 to predict the corresponding filtered output, and so on. As there are three scaling factors (in the general case these are mappings) there are '3 choose 2'=N!/((N−2)!2!)=3!/(1!2!)=3 possible combinations of two maps. In the diagram we label these map sets A, B and C. We now apply each of these mapping sets in turn. E.g., if we test set A, consisting of the candidate mappings *1 and *⅓, then we apply *1 to the whole image I and then compare errors from the actually observed filtered responses $I^F$, and then also apply *⅓ to the whole image I and compare errors from $I^F$. At the pixel level, for this mapping A, which of the two mappings, *1 or *⅓, results in the least error at a pixel results in that pixel being labelled as associated with the first, or the second, mapping. (Associations of whole regions are described below.)

We carry on as above with the alternate mappings B, meaning the scalar multiplier set {*⅓, *½}, and C, meaning the scalar multiplier set {*1, *½}. Now we determine a method for deciding which mapping is the best, overall. If we follow the line labelled A we see the calculations involved in estimating the goodness of this map set. For the input pixel 3 in image I, from mappings set A we can apply a map of either *1 or *⅓. Applying each map in turn we arrive at the two leftmost leaf nodes in FIG. 1: We calculate the predicted filtered response (i.e., we apply the map to the pixel value) calculate error from the actually observed filtered image $I^F$ by subtracting that actual pixel response. In terms of the example we calculate: 3*1−1 and 3*⅓−1 (equaling errors of 2 and 0 respectively for the error for pixels in region '3' mapped to region '1'). Since 0 is less than 2, the mapping *⅓ is chosen as associated with this pixel. Looking at the next leftmost pair of tree nodes, we go through the same procedure for the second pixel '4'. Again in this case we see that *⅓ better predicts the actual filtered outputs (though, not exactly). Based on relation set A alone we would conclude that both pixels '3' and '4' are best mapped to the corresponding filtered counterparts using the same relation, *⅓, and so at this stage we would conclude that both pixels were captured under the same light. If relation set A best modelled our data overall, then our hypothesis that there were two lights would be wrong (only one relation and hence one light was found to be present).

Parsing the rest of the tree, we see that the middle relation branch (relation set B) results in the smallest total of absolute difference between predicted and actual responses. (In this simple example the difference is actually exactly 0). Moreover, we see that pixels '3' and '4' are mapped with two different relations, respectively *⅓ and *½. So, in this case we would conclude that each pixel is captured with respect to a different illuminant. Simple though this example is, it in essence captures the key steps in our invention.

Of course, in real image processing an image will have k pixels or regions. Each pixel will typically be described by an RGB triplet, as will the corresponding filtered counterpart. The relations that predict how camera responses are mapped to filtered counterparts are multidimensional, not scalar, functions. For example the relations could be 3×3 matrix transforms or more complex non-linear maps. Moreover, there are many more maps (N=50 to 100 are used in our experiments) than in FIG. 1 and so there are many more map sets to consider. But, in essence the computation is the same. For every pixel, or region, in the image we find the map (belonging to a set of 2 maps if we are considering m=2) that best maps the RGB(s) to the filtered counterpart(s). We then calculate a prediction error for the whole image. This process is repeated for all possible map sets. The map set that best predicts filtered counterparts from image RGBs can then be used to directly partition the image into regions lit by different lights. According to this invention pixels, or regions, assigned the same map will be assumed to be illuminated by the same light.

If we do not happen to have available any pre-computed mappings from unfiltered to filtered responses, then the chromagenic idea can still obtain by seeking a best mapping between the two images and assigning the majority of pixels best transformed under the mapping found to one label, and all others to a second label. For example, a 'robust' statistical procedure finds the best mapping from one image to the other provided that at least half the image (plus 1 pixel) is approximately associated with that mapping. Pixels not associated correctly are 'outliers' and belong to the second label. In fact, robust mapping can proceed in a hierarchical manner, going on to find the best mapping in just the second-label region, and going on to descend further until there is no good labelling for individual pixels. Region-labelling is then brought into play (see below).

There is a subtlety in our approach: we use chromagenic theory only to find regions lit by different lights but do not estimate the colour of the lights themselves. This might appear a little strange. After all, each pixel, or region, is associated with a single relation and each relation is defined (in a training stage) to be the map that takes RGBs to filtered counterparts for a particular light. We might (wrongly) conclude that once we have identified which regions are lit by the same light that we also know the colour of the light for these regions. We do not know the light colours because chromagenic illuminant estimation tends to work best when there is a large colour diversity in a scene. Often the total number of pixels found to be (say) in a shadow is a relatively small proportion of the size of the image. In this case the best relation mapping RGBs to filtered counterparts might be for the wrong illuminant. This poses a problem if our goal was to estimate the colour of the light. But, here we seek to use the relations only as a means for discriminating between illuminants.

Chromagenic theory will now be discussed. Let us denote light, reflectance and sensor as $E(\lambda)$, $S(\lambda)$ and $Q_k(\lambda)$ where k indexes R, G, B. For Lambertian surfaces, image formation can be written as:

$$q_k = \int_\omega Q_k(\lambda) E(\lambda) S(\lambda) d\lambda \qquad (1)$$

where the integral is evaluated over ω, the visible spectrum. It is useful to combine the triplet of sensor responses $q_k$ into a single vector, which we denote by $\underline{q}$ (underscoring denotes a vector quantity).

Now, let us introduce linear models for light and surface:

$$E(\lambda) \cong \sum_{i=1}^{D_E} \epsilon_i E_i(\lambda) \qquad (2)$$

$$S(\lambda) \cong \sum_{j=1}^{D_S} \sigma_j S_j(\lambda)$$

where $E_i(\lambda)$, i=1 ... $D_E$ form an approximate basis set for illuminants and $S_j(\lambda)$, j=1 ... $D_S$ form an approximate basis set for surfaces; weights $\epsilon_i$ and $\sigma_j$ form the best fit for particular lights and surfaces to these basis sets. Then the image formation equations (Eq. (1)) can be succinctly written as:

$$\underline{q} = \Lambda(\underline{\epsilon})\underline{\sigma} \qquad (3)$$

where $\Lambda(\underline{\epsilon})$ is a 3×N matrix mapping reflectance weights to RGB responses. The kjth term of this Lighting Matrix is given by:

$$\Lambda(\underline{\epsilon})_{kj} = \int_{\omega} Q_k(\lambda) \left[ \sum_{i=1}^{D_E} \epsilon_i E_i(\lambda) \right] S_j(\lambda) d\lambda \quad (4)$$

One formulation of the colour constancy problem is as follows: Given a set of measured response vectors $\underline{q}$, how can we recover the reflectance and illumination characteristics, i.e. recover $\underline{\sigma}$ and $\underline{\epsilon}$?

The linear model basis sets for light and reflectance, used in (2), are generally determined using Principal Component Analysis [9] or Characteristic Vector Analysis [10] in which case the model dimensions $D_E$ and $D_S$ are found to be 3 (for daylights) and 6 to 8 for reflectances. Given that there are only 3 measurements at each pixel, these large dimensions in the model cast doubt on the solubility of colour constancy. However, looking at (3) we see that image formation is in reality predicated on a (light dependent) Lighting Matrix multiplying a reflectance weight vector. While we have no knowledge of $E(\lambda)$ or $S(\lambda)$, we do see that the linearity of (1) is preserved: if we add two lights together we add the respective lighting matrices. It follows that the dimensionality of light and surface, viewed from the perspective of image formation, depends on how well a set of M, 3×N Lighting matrices interacting with N×1 weight vectors model observed image RGBs. By reasoning in this way, Marimont and Wandell [11] demonstrated that a very good model of image formation is possible with only $D_E=3$ (three lighting matrices) and $D_S=3$ (three degrees of freedom in reflectance).

This is encouraging because the model numbers are small. However, they are still not small enough to enable us to decouple light and reflectance. To see why, suppose we have a single illuminant and s reflectances, providing us with 3s measurements and 3s+3 unknowns. Even by observing that there is a scalar indeterminacy between surface lightness and illuminant brightness (since they multiply each other), so that the unknowns number 3s+2, this is still less than the number of known quantities: i.e., 3s<3s+2.

Suppose now, however, that we observe the s surfaces under two lights. We now have 6s measurements and more knowns than unknowns, 6s>3s+5 for two or more surfaces (i.e., 5=6−1=two lights multiplied by 3, minus the brightness indeterminacy). Indeed, a number of authors [12, 13, 14] have presented algorithms which can algebraically solve the colour constancy problem in this case. Implicit to these approaches is the idea that RGBs are mapped across illumination by a 3×3 linear map:

$$\underline{q}_2 = \Lambda(\underline{\epsilon}_2)[\Lambda(\underline{\epsilon}_1)]^{-1} \underline{q}_1 \quad (5)$$

Finlayson [14] observed that because we can always generate the same RGBs (through a judicious choice of sigma weights) under any light, we can only hope to solve the two-light constancy problem if the 3×3 linear transform is unique. Indeed, for most sensors, lights and surfaces, uniqueness was shown to hold in a simplified approximation model and the two-light constancy problem was thus shown to be soluble. However, one of the flaws in this approach is the requirement of having available images of the same surfaces seen under two lights, an impractical requirement in general. In chromagenic theory, rather than capturing a scene under two different lights we instead simulate a second light by placing a filter in front of the camera to generate an additional image. We can write the new filtered responses as:

$$q_k^F = \int_{\omega} Q_k(\lambda) F(\lambda) E(\lambda) S(\lambda) d\lambda, \quad k = R, G, B \quad (6)$$

Let us define a filtered illuminant as $$E^F(\lambda) = E(\lambda) F(\lambda) \quad (7)$$

Then (6) becomes $$q_k^F = \int_{\omega} Q_k(\lambda) E^F(\lambda) S(\lambda) d\lambda, \quad k = R, G, B \quad (8)$$

where the superscript F denotes dependence on a coloured filter. From an equation-counting perspective we now have enough knowns to solve for our unknowns: we simply take two pictures of every scene, one filtered and one not. Importantly, in [7] it was shown, assuming 3 degrees of freedom in light and surface is an accurate enough portrayal of nature, that the transform mapping RGBs to filtered counterparts uniquely defines the illuminant colour. This result led to the chromagenic theory of illuminant estimation.

The algorithm works in 2 stages. In a preprocessing step we pre-calculate the relations, one each for each of N illuminants, that map RGBs to filtered counterparts. For example, we find a set of N 3×3 matrix transforms. In the operation phase, we take a chromagenic pair of images—two images, one unfiltered and one filtered. The illumination is unknown for the new, testing pair. We then apply each of the precomputed relations, and the relation that best maps RGBs to filtered counterparts is used to index and hence estimate the prevailing illuminant colour [7].

The chromagenic method for illuminant estimation is as follows:

Preprocessing: For a database of N lights $E^i(\lambda)$ and s surfaces $S^i(\lambda)$ calculate $T^i \cong Q_i^F Q_i^+$ where $Q_i$ and $Q_i^F$ represent the matrices of unfiltered and filtered sensor responses for the s surfaces, under the ith light; superscript + denotes pseudo-inverse [15]. This generates a best least-squares transform, but the method is not limited to least-squares (e.g., robust methods could be used), nor is the method limited to linear (i.e., matrix) transforms.

Operation: Given P surfaces in a new, test, image we have 3×P measured image RGB matrices Q and $Q^F$. Then the task of finding the best estimate of the scene illuminant $E_{est}(\lambda)$ is solved by finding the index i in our set of N illuminants that generates the least sum of squared errors:

$$i_{est} = \underset{i}{\operatorname{argmin}}(err_i)(i = 1, 2, \ldots, N) \quad (9)$$

with $$err_i \equiv \|T^i Q - Q^F\|$$

It is worth remarking that in the simplest approach the transform matrices are defined by regression (e.g., the Moore-Penrose inverse uses least-squares regression). Therefore, illuminant relations, implemented as 3×3 matrices, do not perfectly transform RGBs to filtered counterparts. This modest imprecision has two consequences which bear on the method in accordance with the present invention disclosed below. First, to accurately estimate the best transform we need a large test set of surfaces (since we wish the relations to apply for all surfaces). Second, if we attempt to estimate the light colour for a small set of surfaces then we might wrongly estimate the illuminant: the best transform for set of red patches might be different from the best transform for a large set of colours (red, greens, white etc.).

Thus, when we run the chromagenic algorithm for an image that has only a small set of surfaces, we will find a relation, according to the algorithm presented above but this relation may in fact index the wrong light colour.

A preferred embodiment of a method according to the present invention will now be described. Given a chromagenic image pair, i.e., RGBs along with corresponding filtered counterparts, we can determine which pixels, or regions, are illuminated by the same lights. Below we define our approach formally, assuming there can be m lights in an image. In practice m<=2 will be appropriate for most images and therefore we set m=2 when we outline the particular implementation of our algorithm that is discussed in the next section.

Let us begin by assuming that for N lights we carry out the chromagenic preprocessing step and solve for the N relations $\Re$ that best map RGBs to filtered counterparts. Here, however, we do not necessarily assume that the relation is a 3×3 matrix transform but rather, for generality, assume an arbitrary function $f: \Im^3 \to \Im^3$, where $\Im$ is the set of possible integers in a colour image (for example, for 16-bit colour channels, $\Im$ is the set [0 ... 65535]). Suppose we now select an m-element subset $R \subset \Re$. Taking each pixel, or region, in turn we determine which of the m relations best maps the RGB(s) to the filtered counterpart(s). Once each pixel, or region, is assigned a single relation it is a simple matter to calculate how well the set of m relations R accounts for our data. Of course there are many possible m-element subsets R in $\Re$. Mathematically, the set of all m element subsets of $\Re$ is denoted $\Re(m)$ and we call this set the m-set of $\Re$. That $R \in \Re(m)$ which best describes the relation between image and filtered counterpart overall is then found through an optimisation procedure (which is essentially a searching algorithm). This effectively finds the m best mappings, and thus an m-level labelling of pixels. E.g., in the case m=2 this amounts to a binary labelling of pixels. This labelling could arise, for example, from shadowed and unshadowed regions.

Before we can write down this optimisation mathematically, we need to introduce a little more notation. Let $\Re = \{f^1, f^2, \ldots f^N\}$ and let $I_k$ and $I_k^F$ denote the kth pixel or region in the image and its filtered counterpart. The relation $f^i$ can be thought of as a mathematical function or computer algorithm that maps an image to filtered counterparts for a particular illuminant labelled i. Thus, is $f^i$ appropriate for the image region $I_k$, we would expect $$f^i(I_k) \approx I_k^F \quad (10)$$

For a given relation set R we have to assign to each pixel, or region, $I_k$ one of the m relations $f^i$, $i \in 1, 2, \ldots, N$ depending on which best predicts $I_k^F$. Remembering that $\Re(m)$ denotes the set of all m-element subsets of $\Re$, and letting $i_k \in 1, 2, \ldots, m$ denote which of the m relations best applies at the kth pixel or region, we then must solve the following optimisation:
General Statement of Optimisation:

$$\min_{R, i_k} \sum k \|f^{ik}(I_k) - I_k^F\|, \quad (11)$$

with $R \in \mathcal{R}(m)$ $i_k \in \{1, 2, \ldots, m\}$

If $I_k$ is a single pixel then $\|.\|$ is some simple scalar function, e.g. the sum of absolute values of vector components, or the square root of the sum of absolute values squared. If $I_k$ is a region there is scope to make $\|.\|$ a more robust measure, e.g. the median deviation.

In the final step of the present method, we wish to identify different regions as belonging to different lights. After solving the optimisation (11), we arrive at the best overall m-element set of mappings R and the best set of pixel labels $i_k$, $k \in 1, 2, \ldots, m$. This associates regions with labels for m lights directly by the relation indices ik as follows: all the pixels, or areas of pixels, where $i_k=1$ are taken as having been imaged under the same light, indexed by '1'. Similarly, all pixels or areas where $i_k=2$ are taken as under another light, index by '2', and so on up to $i_k=m$.

To make our approach slightly more general we allow the goodness of fit operation to be carried out pixelwise but will assign lighting labels on a region by region basis. Suppose we compute an assignment of n regions indexed by k, k=1, 2, ..., n in an image. Many algorithms exist for such a task; such an algorithm is referred to as a segmentation procedure. Let $I_{kj}$ denote the jth pixel in the kth region. We now, initially, assign the relation labels $i_{kj}$ by minimising:
Region-Driven Statement of Optimisation:

$$\min_{R, i_{kj}} \sum_k \|f^{ikj}(I_{kj}) - I_{kj}^F\|, \quad (12)$$

with $R \in \mathcal{R}(m)$ $R \in (1, 2, \ldots, m)$ $i_{kj} \in (1, 2, \ldots, m)$ We can now assign labels to entire regions based on the fits to the underlying pixels:

$$i_k = \text{bestlabel}(\{i_{kj} : i_{kj} \in I_k\}) \quad (13)$$

Here, function bestlabel( ) must choose which label to assign to region k, of all the up to m labels assigned to pixels $I_{kj}$ in region k. An obvious candidate for function bestlabel( ) is the mode function. E.g., if $I_k$ has 100 pixels and, of those 100, and 90 have a relation label i, then the mode is also i and the overall label for the region should also be i. Another candidate would be that label minimising the overall error in mapping unfiltered to filtered pixels, in that region k.

We remark that minimising (11) or (12) can be computationally laborious. The computational cost is proportional to the cardinality of the set $\Re(m)$. If, say, there are 50 relations in $\Re$ (a reasonable number to account for the range of typical lights [16]) then the cardinality of the m-set $\Re(m)$ is $$\frac{50!}{m!(50-m)!}$$

which for m=2, 3, 4, 5 is equal to 1225, 19600, 230300 and 2118110. A brute force search is only really possible for small m, i.e. m=2 or m=3.

If, of course, we allow all possible maps to be in $\Re$ (e.g. all possible 3×3 matrices) then our solution strategy will follow classical optimisation theory (and not the combinatorical approach suggested above). In the optimisation approach we would start with an initial guess of m good transforms and then seek to update these incrementally by minimising a cost function. For example, we might employ the widely used gradient descent method. These differential optimisations tend to find locally, as oppose to globally, optimal solutions.

Hueristic techniques such as simulated annealing might be used to find a global optimum.

To complete this section, we suggest other modifications of the basic algorithm which can be used for illuminant detection. First, though, we have presented the basic theory assuming three RGB sensors and three filtered counterparts, embodiments of the present invention also cover the case where we have six arbitrary sensor response functions (they need not be a filter correction apart). In this case the relation $f(\ )$ best maps the first three sensor responses to the second three. Further we allow other means of arriving at multidimensional response data. For example our method can detect shadows given a normal RGB image and a second image taken where a flash is used to illuminate the scene. In general, methods according to the present invention can be applied to any capture condition which might be written as:

$$q_k^F = \int_v Q_k(\lambda) E(\lambda) S(\lambda) d\lambda, \quad k=1, 2, \ldots, Q \tag{14}$$

where $Q_k((\lambda)$ might be a sensor response function or a sensor multiplied by a filter transmittance. Setting $$Q_k(\lambda) = \frac{E(\lambda) + E^{flash}(\lambda)}{E(\lambda)}$$

accurately models the effect of adding flash light to a scene and is also covered by the present invention.

The number of sensors is also not important for the present invention. Indeed, given a q sensor camera, our method will still work if p of the sensor responses, recorded for different lights and surfaces, are related to the remaining q–p responses by some function $f(\ )$. In the embodiment presented in detail above, q=6 and p=3, but equally q and p could be any two numbers where p<q: q=7 and p=2, or q=3 and p=1. The last case draws attention to the fact that for a conventional RGB camera, we can relate the blue responses to the red and green responses in the manner described above. And, even though the relationship is less strong (e.g. the fit in (9) will have significant error), the method will still provide a degree of illumination detection.

Also, the means by which we relate the first p responses to the remaining q–p responses (for a q response camera) can be written in several general forms. In the method described above, where q=6 and p=3, the unfiltered responses are related to filtered responses by a 3×3 matrix transform. More generally, this map could be any function of the form $f: \mathfrak{R}^3 \to \mathfrak{R}^3$ (a function that maps a 3-dimensional input to a 3 dimensional output). For an arbitrary q (number of sensors) and p (number of dependent responses), the mapping function $f: \mathfrak{R}^{q-p} \to \mathfrak{R}^p$.

We also point out that we can generalise how we compute the distances that we have thus far written as $\|f(I_k^{q-p}) - I_k^p\|$ (where $I^{q-p}$ and $I^p$ denote the first q–p and remaining p responses and the subscript k indexes the kth pixel or region). We can do this in two ways. First, we can use an arbitrary definition of the magnitude function $\|\cdot\|$ e.g. it could be the standard Euclidean distance, or, it could be any reasonable distance function (e.g. such as one of the Minkowski family of norms), Second, we observe that if $f(I_k^{q-p}) \approx I_k^p$ then this implies that the q vector lies in a particular part of q-dimensional space. For example, $f(\ )$ is a p×(q–p) matrix transform then the q vector of responses must lie on a q–p dimensional plane embedded in q space. Thus, rather than computing a relation $f(\ )$ directly and then calculating $|\ \|f(I_k^{q-p}) - I_k^p\|$ we could instead calculate the distance of the q vector of responses to a q–p dimensional plane. It follows we might rewrite our fitting function as: $\|P(I_k) - I_k\|$ where P projects the q vector onto some q–p dimensional plane. Subtracting the projected vector from the original then makes a suitable distance measure.

We can extend this idea still further and write $\|P(I_k - I_k)\| \equiv \|P^\perp(I_k)\|$ projects the q vector of responses onto the p dimensional plane orthogonal to the q–p dimensional plane where we expect $I_k$ to lie. More generally, we might calculate the measure $P(I_k)$ where P is a function that returns a small number when the response vector is likely for the illuminant under consideration. Here P could, for example, be some sort of probabilistic measure.

It is the preferred embodiment of this invention that we determine the fit, or likelihood, that a given q-vector of responses occurs for a given light in a preprocessing step. This might be the 3×3 matrices best mapping RGBs to filtered counterparts for a given training set. Alternatively, for the other embodiments discussed we could precalculate the best relations of the form $f: \mathfrak{R}^{r-q} \to \mathfrak{R}^p$. Or, if we use the position of the response vectors directly, then we could precalculate the best fitting plane or precalculate a probabilistic model which ascribes a likelihood that given q vectors occur under different lights. However, we note that that the fit, or likelihood, that a given q-vector of responses occurs for a given light can be computed within a single image by using the image statistics and this is also covered by our invention. For example, for the case of 3×3 linear maps taking RGBs to filtered counterparts and where there are just two lights present in a scene we might find the pair of transforms that best accounts for the image data (one of the pair is applied at each pixel according to which light is present) by using robust statistics. We find the best 3×3 matrix that maps at least 50% of the image plus one pixel to corresponding filtered counterparts. The remaining pixels are treated as outliers and can be fit separately. The inliers and outliers determine which part of the image are lit by the different lights. Our experiments indicate good illuminant detection in this case. Further, all the different combinations of distance measures, and fitting functions described above, could, in principle, be trained on the image data itself, using standard techniques.

To summarise, in methods according to the present invention when the position of the q vector of responses measured by a camera depends strongly on illumination and weakly on reflectance we can use the position in q space to measure the likelihood of this response occurring under that light. This likelihood can be calculated in many ways including testing the relationship between the first q–p responses to the last p responses (using linear or non linear functions and any arbitrary distance measure). Equally, the position of the q vector can be used directly and this includes calculating the proximity to a given plane or by a computing a probablistic or other measure. The information that is needed to measure whether a q vector is consistent with a given light can be precalculated or can be calculated based on the statistics of the image itself.

There will now be described a method, working with real images, of finding image regions lit by two illuminants. Arguably, the m=2 case is the most interesting and most common case. Many scenes are lit by a single light or by two lights. Often in the outdoor environment there is a single light. As well, there are often two lights: the sun+sky (non-shadow) and the sky alone (shadow). Similarly, indoors at night we may light the room by a single incandescent bulb. Yet, during the day many office environments are a combination of artificial light from above the desk and natural light coming through the window. Indeed, it is hard to think of normal circumstances when m is much larger than 2.

Let us, thus, implement the algorithm given in Eq. (11) for the m=2 case. We begin by creating the set $\Re$, which in this case consists of fifty 3×3 matrix transforms. These transforms were calculated by imaging a standard colour reference chart (the Macbeth Color Checker [17]) under 50 lights one at a time, with and without a coloured filter, using a Nikon D70 camera (which outputs linear (raw unprocessed) images). The 50 lights were chosen to be representative of typical lights that are encountered every day and included: blue sky only, blue sky+sun, overcast sky, fluorescent light and incandescent illumination. The Macbeth Color Checker has 24 different coloured patches and so we solved for each 3×3 transform by regressing the 24 unfiltered RGBs onto the filtered counterparts.

Figure 2A:
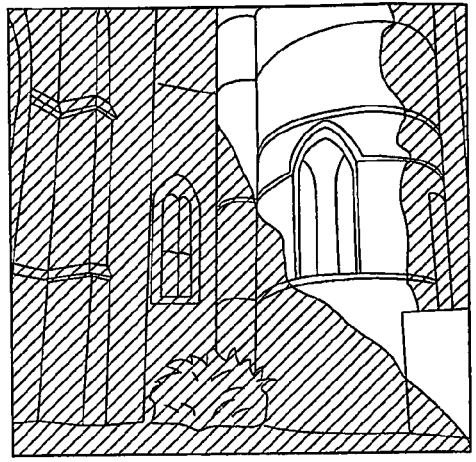
FIGS. 2a and 2b respectively show an original image and its estimated illuminations obtained by a method in accordance with the present invention.
Figure 2B:
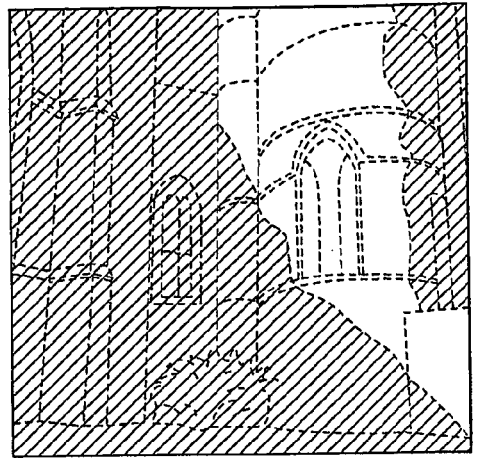

Now we run the algorithm. In the first pass, we start by making use of a pixel-based optimisation algorithm, using Eq. (11): We calculate the 2-set $\Re$ (2): the set of all subsets of $\Re$ with 2 elements. Because there are 50 transforms there are '50 choose 2' equals 1225 combinations. For a given relation set R containing a particular pair of 3×3 matrices, we test which matrix best maps each image pixel to the filtered counterpart. As we do so, we calculate the discrepancy, or error, between the mapped RGBs and the actual filtered responses. We repeat this process over all 1225 combinations of two lights (and hence mappings); we determine that one pair of transforms, one of which is applied at each pixel, that best maps the unfiltered to filtered image overall. FIG. 1 illustrates this process where there are just 3 relations (mappings) and instead of matrices the relations are simple scalar multipliers. FIG. 2 shows typical results of an optimisation Eq. (11) applied at the pixel level. FIG. 2(a) shows the original image; since it has shadows there are clearly two lights present in the scene. It represents noisy, pixel-based detection.

Because a single transform is applied to each pixel, we can view the output of this process as a binary image. Denoting the matrix transform that best fits the data as '0' (for the 1st transform) and '1' (for the second transform), we show our estimate of the illuminations present in the scene in FIG. 2(b). While it is clear that we have some correspondence between shadowed and non-shadow regions, and therefore our algorithm is working, the output is far from perfect. It looks like the correct answer, but appears corrupted by a high degree of noise.

Figure 3A:
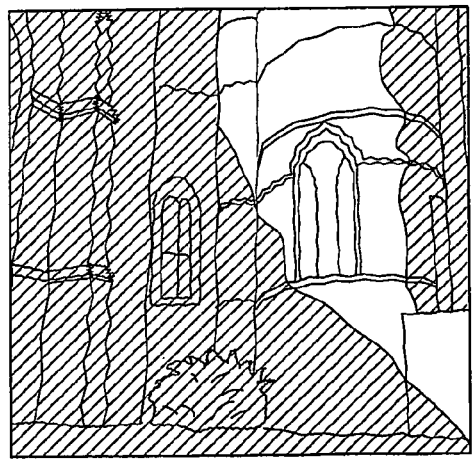
FIG. 3a shows an initial segmentation of an image with the present invention.

Now let us apply the region-based label assignment given by optimisation Eq. (12) followed by Eq. (13). Using the Mean Shift algorithm [18], or any similarly edge-preserving segmentation algorithm, we calculate an initial segmentation of an image. FIG. 3(a) shows the segmentation arrived at by the standard Mean shift algorithm. It will be noted that there are many regions in the image: that is, we have oversegmented the image vis-a-vis our present objective, namely disambiguating shadowed from non-shadowed regions. This is important to note, as we wish to be sure that the segmentation of the input image has not merged regions which are lit by different lights (the degree of segmentation is controllable using parameters that the Mean Shift algorithm uses, and this applies to other edge-preserving segmentation algorithms as well).

Figure 3B:
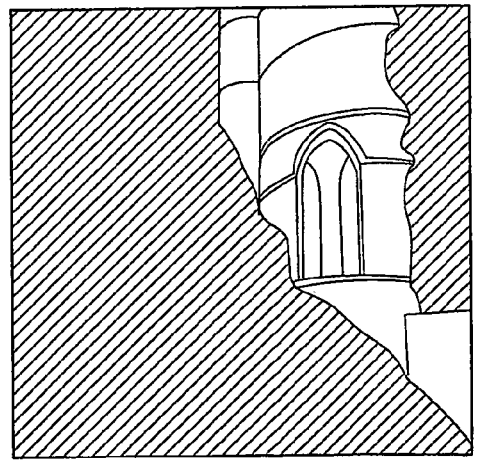

FIG. 3(b) is the result of a region-based illuminant detection procedure. We start with the output given in FIG. 2(b). In conjunction with the regions obtained using the Mean Shift segmentation in FIG. 3(a), we then go on to assign output labels as in Eq. (13). In this variant, for each region we count the proportion of '0's and '1's and assign the majority number to the entire region. The result shown in FIG. 3(b) makes it clear that we have obtained an excellent segmentation of the lights present in the scene.

FIG. 3 represents clean determination of shadow areas. Importantly, we have found this simple approach to illumination detection reliably delivers good results.

Thus, we have disclosed a method for segmenting illumination in images. The method consists of using pre-determined transforms of pairs of images from unfiltered to filtered versions, where a chromagenic filter is utilised. To determine a segmentation with m or fewer illuminant labels, sets of m mappings are applied at the pixel or region level to the image pairs, to best generate an assignment of labels. Alternatively, if no pre-calculated mappings are available, m or fewer assignments of labels can be determined by regression or similar method applied to the image pairs in a hierarchical manner. The region-based approach generates cleaner illumination segmentations, in general.

Where reference is made in this specification to a filtered and an unfiltered image, this includes images with differing filtering characteristics. One can use instead two filtered images with different filtering. Alternatively one can simply use two different cameras, for example cameras of different makes. In a specific example, a conventional digital camera and a camera with a yellow filter are used.

REFERENCES

[1] J. M. Rubin and W. A. Richards. Color vision and image intensities: When are changes material. *Biological Cybernetics*, 45:215-226, 1982.

[2] M. F. Tappen, W. T. Freeman, and E. H. Adelson. Recovering intrinsic images from a single image. In *Advances in Neural Information Processing Systems* 15. MIT Press, 2003.

[3] G. D. Finlayson, S. D. Hordley, and M. S. Drew. Removing shadows from images. In *ECCV* 2002: *European Conference on Computer Vision*, pages 4:823-836, 2002. Lecture Notes in Computer Science Vol. 2353.

[4] C. Fredembach and G. D. Finlayson. Hamiltonian path based shadow removal. In *British Machine Vision Conf,* 2005.

[5] G. D. Finlayson and P. M. Morovic. Human visual processing: Beyond 3 sensors. In *IEE Int. Conf. on Visual Information Engg.* (*VIE*2005), pages 1-7, 2005.

[6] G. D. Finlayson, S. D. Hordley, and P. M Morovic. Chromagenic filter design. In 10*th Congress of the Int. Colour Assoc.* (AIC2005), 2005.

[7] G. D. Finlayson, S. D. Hordley, and P. M Morovic. Colour constancy using the chromagenic constraint. In *Computer Vision and Ratt. Rec.* (*CVPR*2005), 2005.

[8] G. D. Finlayson. Image recording apparatus employing a single ccd chip to record two digital optical images. Awarded US patent, May 2006, U.S. Pat. No. 7,046,288.

[9] J. P. S. Parkkinen, J. Hallikainen, and T. Jaaskelainen. Characteristic spectra of Munsell colors. *J. Opt. Soc. Am. A*, 6:318-322, 1989.

[10] L. T. Maloney and B. A. Wandell. Color constancy: a method for recovering surface spectral reflectance. *J. Opt. Soc. Am. A*, 3:29-33, 1986.

[11] D. H. Marimont and B. A. Wandell. Linear models of surface and illuminant spectra. *J. Opt. Soc. Am. A*, 9:1905-1913, 1992.

[12] M. D'Zmura and G. Iverson. Color constancy. I. Basic theory of two-stage linear recovery of spectral descriptions for lights and surfaces. *J. Opt. Soc. Am. A*, 10:2148-2165, 1993.

[13] M. Tsukada and Y. Ohta. An approach to color constancy using multiple images. In *Int. Conf. on Computer Vision (ICCV90)*, 1990.

[14] G. D. Finlayson, M. S. Drew, and B. V. Funt. Diagonal transforms suffice for color constancy. In *Int. Conf. on Computer Vision (ICCV93)*, 1993.

[15] G. Strang. Linear *Algebra and its Applications*. Harcourst, Brace, Jovanovich, 3rd edition, 1988.

[16] K. Barnard, L. Martin, B. V. Funt, and A. Coath. A data set for colour research. *Color Research and Application*, 27:147-151, 2002.

[17] C. S. McCamy, H. Marcus, and J. G. Davidson. A color-rendition chart. *J. App. Photog. Eng.*, 2:95-99, 1976.

[18] D. Comaniciu and P. Meer. Mean shift: A robust approach toward feature space analysis. *PAMI*, 24:603-619, 2002.

The invention claimed is:

1. A method for identifying light sources in an image, comprising:
    obtaining a first image having a first set of spectral components;
    obtaining a second image that corresponds to the first image, the second image having a second set of spectral components that differs from the first set of spectral components; and
    segmenting the first image into one or more regions that are illuminated by different light sources by:
        applying a plurality of sets of two or more pre-computed mappings to the first image; and
        determining which of the plurality of sets most closely maps pixels in the first image to corresponding pixels in the second image.

2. The method of claim 1 wherein each of the pre-computed mappings is a linear transform and wherein the act of applying a plurality of sets of two or more pre-computed mappings to the first image comprises applying each of two or more linear transforms in each of the plurality of sets to each pixel in the first image to determine predicted filtered pixel values.

3. The method of claim 1 wherein the act of determining which of the plurality of sets most closely maps pixels in the first image to corresponding pixels in the second image comprises performing a statistical analysis on results of the application of each of the plurality of sets to the first image.

4. The method of claim 1 wherein the first and second images are counterparts of each other with different filtering.

5. The method of claim 1 wherein the first image is an unfiltered image and the second image is a filtered counterpart of the first image.

6. The method of claim 1 wherein the first image is produced by an RGB camera and the second image is a filtered RGB counterpart of the first image.

7. The method of claim 1 wherein the first image is produced by an RGB camera and the second image corresponds to a set of one or more sensor responses corresponding to the first image.

8. The method of claim 7 wherein the set of sensor responses includes CMY values.

9. The method of claim 1 wherein the first image is a multispectral image taken by a camera with at least two sensors and the second image is a multispectral image taken by at least one further sensor of the camera.

10. The method of claim 1 further comprising rendering the first image based, at least in part, on the one or more regions.

11. The method of claim 1, wherein each of the plurality of sets comprises two pre-computed mappings.

12. The method of claim 11, wherein the act of determining which of the plurality of sets most closely maps pixels in the first image to corresponding pixels in the second image comprises:
    determining a predicted filtered value for a plurality of pixels in the first image by applying each of the pre-computed mappings in each set to the plurality of pixels;
    determining an error value, for each of the pre-computed mappings, between the predicted filtered value of each of the plurality of pixels and an actual value of a corresponding pixel in the second image;
    determining, for each set, which of the pre-computed mappings in the set minimizes the error value for each of the plurality of pixels;
    assigning, for each set, the error value for the determined pre-computed mapping to each of the plurality of pixels;
    summing, for each set, the assigned error values to determine an aggregate error value for the set; and
    identifying the set having a lowest aggregate error value as the set that most closely maps pixels in the first image to corresponding pixels in the second image.

13. The method of claim 1, wherein the act of segmenting the first image into one or more regions that are illuminated by different light sources further comprises assigning a label to a plurality of pixels in the first image, wherein the assigned label corresponds to one of the pre-computed mappings in the set that most closely maps pixels in the first image to corresponding pixels in the second image.

14. The method of claim 13, wherein the act of assigning a label to a plurality of pixels in the first image comprises assigning a label corresponding to the pre-computed mapping that minimizes an error between a calculated pixel value and an actual pixel value for a corresponding pixel in the second image.

15. The method of claim 13, wherein the act of segmenting the first image into one or more regions that are illuminated by different light sources further comprises:
    dividing the first image into one or more image segments;
    identifying, for each segment, the label that is assigned to the highest number of pixels in the segment; and
    assigning the identified label to the one or more segments.

16. The method of claim 15, wherein the act of segmenting the first image into one or more regions that are illuminated by different light sources further comprises identifying each of the one or more segments that are assigned different labels as illuminated by different light sources.

17. A non-transitory program storage device having instructions stored thereon to cause one or more processors to:
    receive a first image having a first set of spectral components;
    receive a second image that corresponds to the first image, the second image having a second set of spectral components that differs from the first set of spectral components;
    segment the first image into one or more regions that are illuminated by different light sources by:
        applying a plurality of sets of two or more pre-computed mappings to the first image; and
        determining which of the plurality of sets most closely maps pixels in the first image to corresponding pixels in the second image.

18. The non-transitory program storage device of claim 17, wherein the instructions to cause the one or more processors to apply a plurality of sets of two or more pre-computed mappings to the first image comprise instructions to cause the one or more processors to generate the plurality of sets from a plurality of pre-computed mappings.

19. The non-transitory program storage device of claim 18, wherein each of the plurality of pre-computed mappings maps an image to a filtered counterpart for a particular light source.

20. The non-transitory program storage device of claim 17, wherein the first image is an unfiltered image and the second image is a filtered counterpart of the first image.

21. The non-transitory program storage device of claim 17, wherein the instructions to cause the one or more processors to segment the first image into one or more regions that are illuminated by different light sources further comprise instructions to cause the one or more processors to assign a label to a plurality of pixels in the first image, wherein the assigned label corresponds to one of the pre-computed mappings in the set that most closely maps pixels in the first image to corresponding pixels in the second image.

22. The non-transitory program storage device of claim 21, wherein the instructions to cause the one or more processors to assign a label to a plurality of pixels in the first image comprise instructions to cause the one or more processors to assign a label corresponding to the pre-computed mapping that minimizes an error between a calculated pixel value and an actual pixel value for a corresponding pixel in the second image.

23. The non-transitory program storage device of claim 21, wherein the instructions to cause the one or more processors to segment the first image into one or more regions that are illuminated by different light sources further comprise instructions to cause the one or more processors to:
 divide the first image into one or more image segments;
 identify, for each segment, the label that is assigned to the highest number of pixels in the segment; and
 assign the identified label to the one or more segments.

* * * * *